Jan. 4, 1955          W. L. MORGAN          2,698,596
                     SIGNALING MIRROR
Filed Sept. 12, 1952                    2 Sheets-Sheet 1

INVENTOR.
Willard L. Morgan
BY
Nobbe & Swope
ATTORNEYS

Jan. 4, 1955 W. L. MORGAN 2,698,596
SIGNALING MIRROR

Filed Sept. 12, 1952 2 Sheets-Sheet 2

INVENTOR.
Willard L. Morgan
BY
Nobbe & Swope
ATTORNEYS

United States Patent Office

2,698,596
Patented Jan. 4, 1955

2,698,596

SIGNALING MIRROR

Willard L. Morgan, Pittsburgh, Pa., assignor to Libbey-Owens-Ford Glass Company, Toledo, Ohio, a corporation of Ohio Application September 12, 1952, Serial No. 309,294

5 Claims. (Cl. 116—20)

This invention relates broadly to signaling devices for reflecting sunlight to desired targets. More particularly, it relates to an improved signaling mirror adapted for hand manipulation and having means associated with the highly reflective surface thereof for readily directing rays of sunlight from said surface to a swiftly moving target.

Signaling mirrors of this type are used principally by persons in distress for attracting the attention of a potential rescuer at a distance where normal means for so doing are inadequate. The potential rescuer, in addition to being a swiftly moving and elusive target, is generally silhouetted against a bright and glaring sky. Thus, speed and consequently ease of handling by the operator are of the essence.

The speed with which a target may be signaled is, of course, dependant upon the operator of the mirror being enabled to readily locate the target and direct reflected rays of the sun thereto. For this purpose, it has generally been the practice to provide signaling mirrors of this type with windows through the reflective surfaces thereof, through which an operator may sight, and to position a retroreflective surface behind and covering at least a portion of said window. In this manner, the operator, by properly aiming and orienting the mirror while sighting through the window thereof, in a manner well known in the art and to be more fully explained hereinafter, is enabled to simultaneously see the target and a virtual image of the sun and to superimpose this image on the target, at which time a signal is properly directed thereto.

To be more specific, when the reflective surface of the mirror is properly faced toward the sun, certain of the rays therefrom will strike and be reflected by said surface while others will strike the window therethrough. Certain of the rays which strike the window will be retroreflected by the retroreflective surface positioned therebehind, and subsequently reflected back to the eye of the observer positioned behind the window through the clear portions of said window. Thus, as the rays of the sun are being reflected from the mirror, a virtual image of the sun is presented to the eye of the observer. As will be more fully understood, by properly aiming the mirror so as to bring both the image and the target into view within the window and to superimpose this image upon the target, the operator is enabled to direct the reflected rays thereto.

It is an object of this invention to provide an improved signaling mirror of the type described in which the operator is enabled to have a maximum range of vision in sighting through the window of the mirror.

Another object of this invention is to provide a signaling mirror in which a retroreflective surface is so positioned behind a window through the mirror that the operator is enabled to have the widest possible range of vision parallel to the path of travel of the target and at the same time to employ the optimum area of retroreflective surface.

Still another object of this invention is to provide a signaling mirror of the type described which may be operated by hand manipulation with either the right or left hand with equal facility.

Other objects and advantages of the invention will become more apparent during the course of the following description when taken in connection with the accompanying drawings.

In the drawings, wherein like numerals are employed to designate like parts throughout the same:

Briefly stated, according to this invention a retroreflective surface is placed behind a window in the highly reflective surface of a mirror and is disposed so as to only partially cover said window. This retroreflective surface extends across the entire width of the window and is bounded by at least one adjacent clear space through the window, which space extends at least substantially the entire width thereof. As well, it is contemplated according to this invention to provide clear spaces symmetrically above and below the wide strip of retroreflective surface. Also, it is contemplated that clear and/or filtered openings or sighting apertures may be provided in said strip. Even further, appropriate filtered areas may, if desired, be placed over the retroreflective surface.

Figure 1:
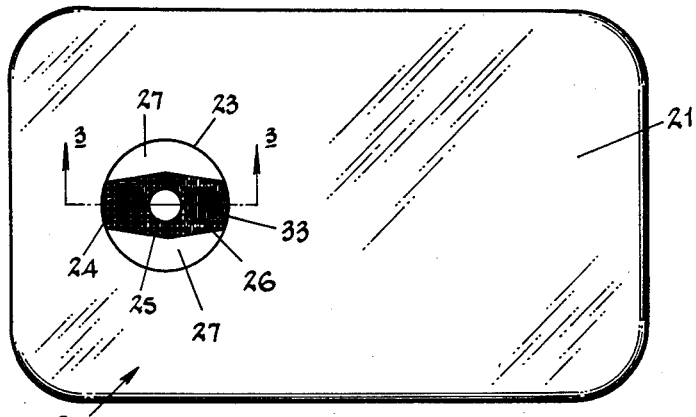
Fig. 1 is a front plan view of one form of signaling mirror embodying this invention.
Figure 2:
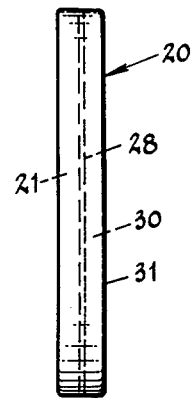
Fig. 2 is a side view of the mirror shown in Fig. 1.
Figure 3:
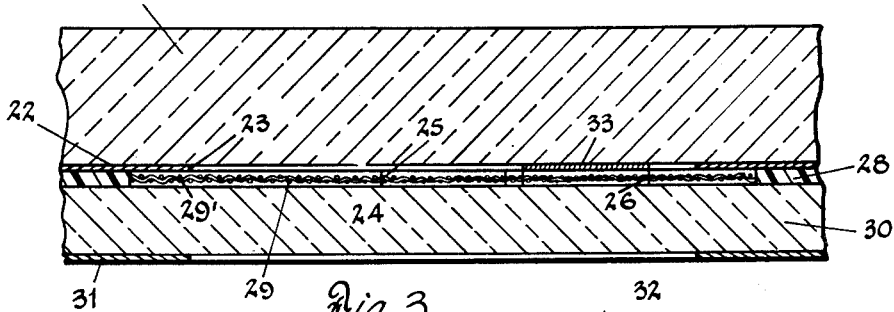
Fig. 3 is an enlarged sectional view of the mirror shown in Fig. 1 taken substantially along the line 3—3.

Referring now to the drawings, and particularly to Figs. 1 to 3 thereof, there is shown one form of signaling mirror constructed in accordance with this invention and designated in its entirety by the numeral 20. A mirror element 21 of polished plate glass, tempered glass, or other suitable refractive material, is provided at its rear surface with an opaque metallic mirror coating 22, preferably of silver, aluminum, or chromium. An uncoated circular portion on the rear surface of the mirror element 21 forms a transparent window 23 therethrough.

To facilitate one-handed manipulation of the signaling mirror, it is contemplated that the dimensions of mirror element 21 be approximately 3 by 5 inches. As shown in Fig. 1, the window 23 is preferably located centrally of the horizontal long axis of the element 21 and toward one short edge thereof. For a reason to be explained hereinafter, the center of said window is located approximately one-half the average interpupillary distance from said short edge.

Figure 9:
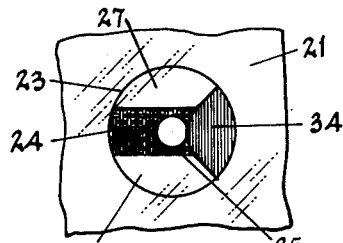
Figure 7:
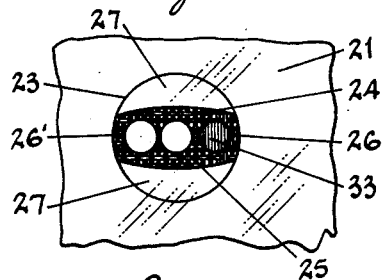

Behind and extending the entire width of window 23 is a strip of retroreflective surface 24, which may be apertured in this form of signaling mirror, centrally at 25 and to one side thereof at 26. As shown in Fig. 1, the retroreflective strip extends centrally of the width of window 23 and its mean vertical dimension may be approximately one-half that of said window. Thus, symmetrically arranged and crescent-shaped clear spaces 27 extend substantially the entire width of window 23, providing a wide angle of vision particularly along the horizontal path of the target. In this embodiment of the invention, the top and bottom edges of the retroreflective surface are shown as being slightly pitched, for a purpose to be explained. It is to be understood, however, that the pitched edges may be rounded, as shown in Fig. 7, or, for that matter, the edges may be straight and parallel to the horizontal edges of mirror element 21, as shown in Fig. 9.

Retroreflective surface 24 may be formed of retroreflector sheets marketed by the Minnesota Mining and Manufacturing Company under the trade name "Scotchlite," although it would be within the realm of this invention to use other products having similar retroreflective properties. Thus, in its preferred form, said retroreflective surface comprises a disc-like opaque paper member into which are embedded or secured in any suitable manner individual, spherical "Scotchlite" type beads having high angularity retroreflective surfaces. This type of retroreflector is preferred as it has been found to be a good contrast against the clear space 27 in sighting through window 23. However, if desired, the form of retroreflector shown in Patent No. 2,557,108 may be used, in which case the beads are supported on the strands of a wire mesh screen.

Figure 4:
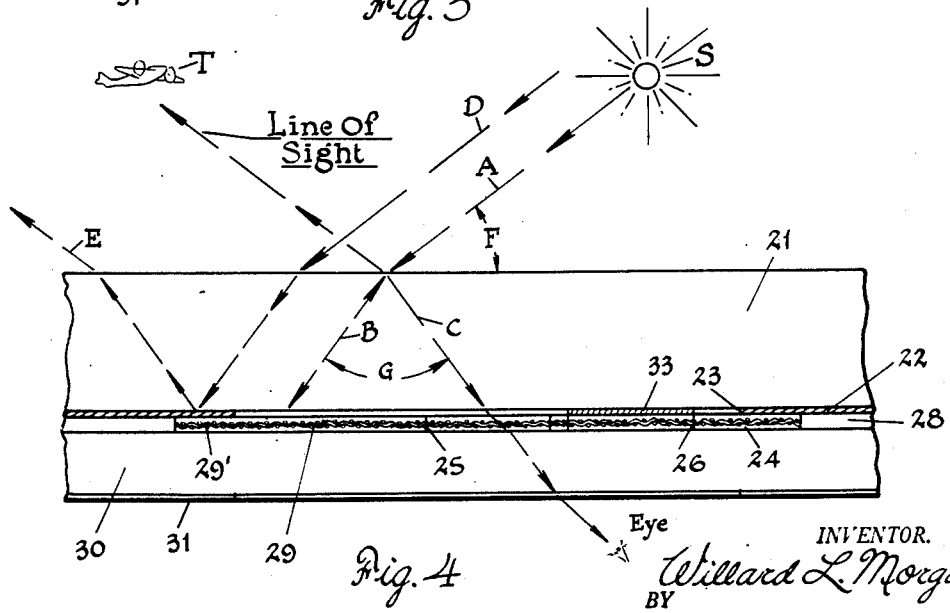
Fig. 4 is an enlarged sectional view similar to Fig. 3, showing the manner of using the mirror.

As shown in Figs. 3 and 4, the retroreflective strip 24 is slightly wider than window 23 such that portions at each end thereof project a short distance over the back of mirror coating 22. For the purpose of retaining said strip in the proper position behind and over the window 23, a washer 28 of a thermoplastic resin, such as polyvinyl butyral or other suitable bonding material, is positioned behind the mirror element 21 and provided with an aperture 29 generally corresponding to said window and notched at 29' to receive the projecting end portions of the retroreflective strip 24, as shown in Fig. 3.

A retaining plate 30 of glass or other transparent material is disposed rearwardly of washer 28, and the mirror element, washer, and retaining plate are bonded together in air-tight relation in any suitable manner to form a composite unit. It can be seen from Figs. 1 and 2 that retaining plate 30, of a size corresponding to washer 28 and mirror element 21, forms therewith a flat rectangular laminated article which is well adapted in shape and size for hand manipulation. As well, retroreflective surface 24 is securely held in place behind the window 23 in an air-tight, moisture free space enclosed by the aperture 29 through the washer 28.

The rear surface of retaining plate 30 may be covered with a black paint or other suitable opaque backing material, as at 31, except for an opening 32 corresponding in size to window 23 for sighting therethrough. On the background provided by this backing, instructions on the use of the mirror may be printed.

It is to be understood, of course, that the washer 28 and retaining plate 30 need not necessarily correspond to the rectangular shape of mirror element 21. To the contrary, these elements may be in the form of cylindrical discs slightly larger than window 23 and projecting from the back of mirror element 21 in "button"-like fashion.

As previously mentioned, sighting apertures 25 and 26 may be provided through retroreflective surface 24. As shown in the form of signaling mirror of Figs. 1 to 4, the off-center aperture 26 may be provided with a colored filter 33, by means of which the observer is enabled to sight more clearly against a bright sky. Preferably, aperture 26 is located very closely to aperture 25 such that when the observer's eye passes from one aperture to the other in a manner to be explained, the apertures will appear as a continuous slot and the line of vision will not be seriously impaired.

The colored filter 33 may be painted or stenciled onto the rear surface of mirror element 21 within window 23 so as to be opposite aperture 26 in a manner, for example, as shown and described in my copending application, Serial No. 273,921, filed February 28, 1952. Alternatively, the filter 33 may take the form of a separable disc retained within aperture 26, but in any case it is designed to cover said aperture.

Referring now to Fig. 4, the signaling mirror 20 is shown diagrammatically in operating relation with respect to a target T, the sun S, and the eye of the observer. In using the mirror and bringing it to the operative position shown in Fig. 4, initially it is faced toward the sun S and target T and held by the observer in such a manner that his eye is directly behind window 23. The sun's rays, which fall on the coated surface of said mirror, are reflected forwardly from the mirror coating 22. With the window disposed toward one short edge with its center spaced inwardly of said edge approximately one-half the interpupillary distance, it can be seen that as the observer sights through window 23 with one eye, he can see around the adjacent edge of the mirror with the other eye. This has been found to be of great advantage in using the mirror, especially in initially locating the target such that it may be brought within the window 23.

Another advantage of so locating the window toward one short edge of the mirror is that the observer may easily manipulate the mirror with one hand placed on the opposite solid end thereof. For example, if the mirror 20 of Fig. 1 were grasped at the solid end with the left hand of the observer and the left eye placed behind window 23, it can be understood that the hand would be out of the way of the observer's face. Similarly, were the mirror to be grasped at the solid end in the right hand of the observer and the right eye placed behind the window, the right hand would not interfere with sighting through said window. It will be observed that when the mirror is thus held in either hand, that the crescent-shaped clear spaces 27 and sighting apertures 25 and 26 are elongated in the direction parallel with the horizon and the wide angle of view along such direction is very helpful in following moving targets such as airplanes and ships, since the movement of the latter is primarily in said horizontal direction parallel to the horizon. It is thus preferable that the clear spaces and sighting apertures be orientated parallel with the long dimension of the mirror, as shown in Fig. 1. It is apparent, however, that other arrangements are useful and that, in any case, the mirror could be held in such a manner that the long edge of each of the elongated clear spaces would be disposed parallel to the horizon and/or path of the moving target.

While the mirror is held as described, it is faced so that the axis of the window 23, or a line perpendicular to the plane of the mirror, will lie approximately between the target and the sun. With the mirror in this approximate position, the observer, in sighting through the window, will see a virtual image of the sun by means of certain of the sun's rays such as A (Fig. 4), for example, which, in being transmitted through the mirror element 21, will strike retroreflective strip 24 and be retroreflected thereby as at B to the front surface of said mirror element and reflected from said front surface as at C through sighting aperture 25 to the observer's eye. It will be understood, of course, that not all of the sun's rays which strike the retroreflective strip will be reflected to the observer's eye as a virtual image of the sun. However, it will also be understood that, depending on the size and location of clear spaces 27 as well as sighting apertures 25 and 26, a number of said rays will be so reflected. That is, a number of the rays will be reflected in such a manner as to pass through the clear spaces or sighting apertures.

Thus, the observer in approximately aiming the mirror in the manner above described, will be enabled to quickly see a virtual image of the sun in any one of the clear spaces or sighting apertures. In this respect, as a practical matter only the upper clear spaces are used normally by the observer. That is, except in the unusual situation in which the sun is very low on the horizon, the virtual image will appear only in the upper clear space. By having an elongated edge of retroreflective material adjacent an elongated clear space, I have found that regardless of the location of the sun in the semispherical sky space through clear space 27 and the consequent widely varied angles of incidence F (Fig. 4) of the sunlight on the mirror face and retroreflective surface, a virtual image of the sun is very quickly found. This is made possible by having the retroreflective strip 24 extend substantially the entire width of window 23 so as to be adjacent to or form the margin of said window. That is, by its extended length, particularly in the horizontal direction or parallel with the horizon as used, the retroreflective strip will provide a readily apparent virtual image regardless of wide variations in the angle of incidence F of the sun S and consequent wide variations of the angle G. As angle G varies, it is evident that the spread between rays B and C increases or decreases and it therefore becomes essential for quick aiming that an extended margin between the adjacent retroreflective strip 24 and clear areas of window 23 be present so that rays B and C will fall into each of these areas.

When the virtual image has been located as noted above, the observer in sighting with one eye through window 23 also locates the target within the window. As mentioned previously, the observer is aided in first locating the target by sighting with the other eye beyond one side edge of the mirror. Further, the wide clear space adjacent the retroreflective strip 24 provides the observer with a wide range of vision in locating and holding the target within the window while simultaneously maintaining the sun's virtual image therein. For example, when a signaling mirror with a window one inch in diameter and having a retroreflective strip extending the entire width thereof, in accordance with this invention, is held one inch from the observer's eye, an image of a jet plane 10 miles away will require a full minute in traversing said wide clear space. In such time, the plane moves approximately 10 miles.

It was found, on the other hand, that with the advent of jet planes traveling at speeds exceeding 600 miles per hour, an observer experienced great difficulty in locating a target such as a jet plane when his range of vision within the window was confined to a small sighting aperture, such as 25. Even more difficulty was experienced in following and accurately superimposing the image accurately upon the swiftly moving target. At the same time, an adequate area of retroreflective surface over the window 23 is essential in order that a bright virtual image may be readily located by the observer. As well, of course, a sufficient area of retroreflective surface is necessary as a screen against the brilliant sky viewed through said window.

I have discovered that a proper balance of retroreflective surface and clear space through the window may be obtained by using a retroreflective strip of the shape hereinabove described. Not only is the observer enabled to see a bright and clear virtual image of the sun, but at the same time he is permitted a maximum range of vision parallel to the normal path of travel of the target. As mentioned previously, the top and bottom edges of the strip may be slightly pitched and, if desired, rounded. In this manner, an even greater width of clear space is possible without sacrificing an adequate area of retroreflective surface surrounding the sighting apertures 25 and 26. As well, the slight pitch of the edges of the strip provides a reference line which approximately conforms to the horizon and aids the obserber in swinging the mirror to follow the path of the target.

I have further discovered that by providing these wide clear spaces both above and below the retroreflective strip, the signaling mirror of this invention may be made particularly adaptable for both right and left handed use. That is, for example, the mirror as shown in Fig. 1, may be grasped by the left hand of the observer and in use will reflect to said observer's left eye a virtual image either in the sighting apertures 25 or 26 or the upper clear space 27. If, however, it is desired to grasp the mirror in the right hand, it need only be rotated 180 degrees on its axis, at which time the right handed user may sight through the window 23 with his right eye. In this position, the mirror will ordinarily enable the observer to see a virtual image of the sun in either sighting aperture 25 or 26 or the opposite clear space 27 (lower as shown in Fig. 1).

In completing the aiming operation then, the mirror is oriented in such a manner as to superimpose the virtual image upon the target, at which time, as illustrated diagrammatically by sun's ray D being reflected as at E from the mirror coating 22 of mirror element 21, certain of the sun's rays are being directed to the target T as a signal thereto. Of course, the observer then continues to orient the mirror with the path of travel of the target in order to maintain said signal on the target. In this respect, it will be readily appreciated that this task is made a relatively simpler one by the wide angle range of vision through clear space 27.

The simplest embodiment of signaling mirror within the scope of this invention would involve merely a retroreflective strip covering approximately one-half of the window 23. For that matter, the strip may be in semi-circular form covering only the lower half of the window, although an improved form of mirror adaptable for both right and left hand use would require that the strip be located centrally of the window, or at least in such a manner that clear spaces would be provided both above and below said strip.

In other words, an operable signaling mirror may be constructed without the use of sighting apertures through the retroreflective strip. However, it has been found that a relatively small opening through window 23, such as sighting aperture 25 or 26, is of aid to the observer in accurately superimposing the virtual image on the target. As well, a filtered clear space in the window enables the observer to reduce the brilliancy of the target and sky by merely shifting his line of vision to said space. As previously mentioned, due to the location of this filtered clear space relatively near an unfiltered space, the observer is enabled to shift his line of vision from one to another without a marked interruption of vision. While the centermost sighting aperture 25 is shown herein as unfiltered and the other aperture 26 as filtered, it will be understood that the relative positions may be interchanged without departing from the scope of this invention.

In its preferred form then, the signaling mirror of this invention enables the observer to have a maximum range of vision in sighting upon a moving target and to more quickly locate the virtual image of the sun without detracting in any way from the advantages heretofore possible with signaling mirrors having sighting apertures.

Figure 5:
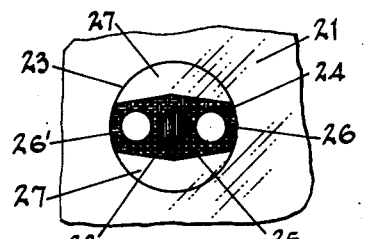
Figs. 5 to 12 are detail plan views of other forms of signaling mirrors and particularly the window portions thereof.
Figure 6:
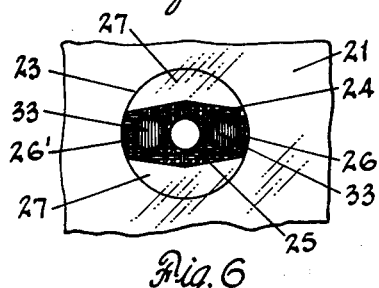

The forms of signaling mirrors of this invention shown in part in Figs. 5 to 7 are similar to the form of Figs. 1 to 4, described in detail above, except in the number and arrangement of sighting apertures. Each of these forms has an additional off-center aperture 26' on the opposite side of centrally located sighting aperture 25 from off-center aperture 26. In each form, the several apertures are equally spaced apart and aligned with the longitudinal axis of retroreflective strip 24. As previously mentioned, the pitched edges of said strip may be rounded in a manner shown in Fig. 7.

In the form shown in Fig. 5, a filter 33 is placed over the center aperture 25; in the form of Fig. 6, a filter is placed over off-center apertures 26 and 26'; and in the form of Fig. 7, a filter is placed over the rightmost off-center aperture 26. Various modifications of these arrangements will be suggested to one skilled in the art. It is noted that the form of Fig. 6 is particularly adapted for either right or left hand use. That is, inasmuch as filtered apertures are provided at each side of the center aperture 25, the virtual image of the sun may be superimposed over the target in sighting through center aperture 25, and regardless of its disposition, the mirror need only be moved in the direction of movement of the target in order to permit the observer to sight through a filtered aperture.

In the form of signaling mirror shown in Fig. 9 and contemplated by this invention, only one sighting aperture 25 is provided in the retroreflective strip 24, which, as previously mentioned, may be formed with straight horizontal edges. However, a colored filter 34 is provided in front of a portion of said strip as well as over corner portions of clear spaces 27. This filter may be applied, as in the case of the forms of signaling mirrors previously described, either integrally to the surface of mirror element 21 or as a separable member. In any case, it may be of a substantially parabolic shape which extends from one side of window 23 to a point tangential of sighting aperture 25.

As in the case of filter 33 over sighting apertures 25, 26 and 26', that portion of the filter 34 which overlies the corners of clear spaces 27 serves the purpose of permitting the observer to reduce the brilliance of the sky in sighting through the window 23. That portion of the filter 34 which is disposed between the window 23 and retroreflective strip 24, however, serves a different purpose. When, in aiming the mirror, the portion of said strip which covers filter element 34 is disposed toward the sun and away from the target T, it will be understood that the rays of the sun which are retroreflected to the eye of the observer as a virtual image will not strike said portion. As well, it will be understood that when said portion is oppositely disposed toward the target, the above mentioned rays, such as A in Fig. 4, will strike said portion and absorb the color of filter 34 to produce a colored virtual image.

Thus, by rotation of the mirror through its axis approximately 180 degrees the observer may, if desired, selectively change the brilliance of the sun's virtual image. This has been found to be of great assistance in the aiming operation. For example, in the initial stages of the operation when the observer is locating the virtual image, it is advantageous that the image be bright against the sky. On the other hand, this bright spot is fringed and fuzzy and its outline is not distinct and with distant objects, its brightness completely obscures the target. Thus, in accurately superimposing the image on the target, it is advantageous to do so with an image which has been rendered clear and well defined by the filter 34 and is of such reduced intensity that the target may be clearly seen when such an image is superimposed thereon.

Figure 10:
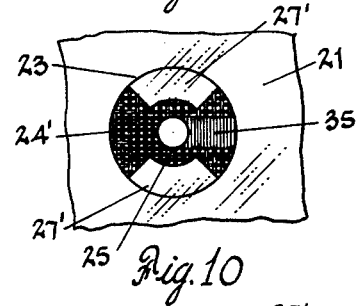

A result similar to that discussed above may be obtained with the form of mirror shown in Fig. 10, wherein a colored filter 35 extends between a portion of retroreflective strip 24 and window 23 and is adjacent a portion of sighting aperture 25. In this form, however, the clear spaces 27' are not filtered, and consequently, they may not be used by the observer in reducing the brilliance of the sky. Also, it will be noted that in this form, the retroreflective strip 24' is of a slightly different shape than strip 24 in Figs. 1 to 7 and 9, as are the arcuately shaped clear spaces 27'. Although, in this form, the clear spaces do not permit the observer as wide a range of vision, a greater area of retroreflective surface is provided, especially adjacent said clear spaces.

Figure 11:
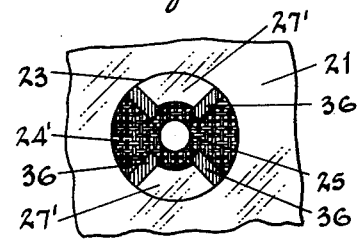

The form of signaling mirror shown in Fig. 11 is quite similar to that of Fig. 10 except that smaller, radially directed filter elements 36 are provided at each side edge of the clear spaces 27' adjacent retroreflective strip 24'. In this manner, the observer is enabled to locate the virtual image of the sun in either of the clear spaces 27' and, in rotating the mirror on its axis, may selectively change the brilliance of said image, as previously explained. Thus, in this form of signaling mirror, a change in brilliance of the image requires only a slight rotating or turning of the mirror.

Figure 8:
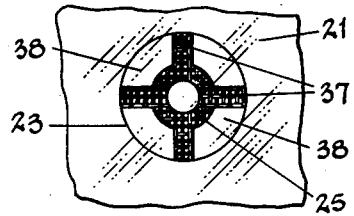
Figure 12:
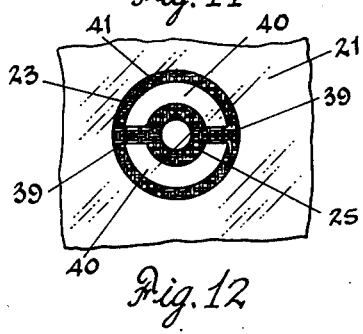

Signaling mirrors of the type illustrated in Figs. 8 and 12 are also contemplated by this invention. As shown therein, each of the retroreflective strips 37 and 39, similarly to strips 24 and 24' of the other forms, extends the entire width of window 23. As well, the clear spaces 38 and 40 extend substantially the width of said window and are adjacent said strip.

However, in the form of Fig. 8 the retroreflective strip 37 is in the form of a cross having a centrally located hub portion surrounding sighting aperture 25. The cross-shaped strip defines four segmental clear spaces 38 which together form clear areas substantially the entire width of window 23. In the form of Fig. 12, on the other hand, retroreflective strip 39 has relatively narrow horizontal portions extending outwardly from a similar hub portion and is connected at its outer ends with an annular ring 41 of retroreflective material, said ring bordering window 23. Of course, if desired, sighting aperture 25 in either form may be filtered. In these forms of mirror, the virtual image of the sun will be visible in even greater areas of the clear spaces adjacent retroreflective strips 37 and 39.

It is to be understood that the forms of the invention disclosed herein are to be taken as the preferred embodiments thereof, and that various changes in the shape, size and arrangement of parts may be resorted to without departing from the spirit of the invention or the scope of the following claims. For example, it is apparent that the mirror coating 22 might be placed on the front surface of the mirror element 21 with a window formed therein and a retroreflective strip applied as shown herein on the rear or inside surface of said mirror element. Also, it is possible to employ in the signaling mirrors of this invention partially transparent mirror coatings as well as opaque ones.

I claim:

1. A mirror signaling device for reflecting sunlight to a desired target, comprising a transparent support, an opaque mirror coating upon one surface of said support provided with an open space therein, an elongated retroreflective element of reduced light transmission on the back of said support disposed in and extending the entire width of said open space and defining an elongated clear window thereabove through said open space, said elongated clear window providing a relatively wide angle view therethrough of the sky horizontally and having a relatively narrower dimension which restricts the entrance of diluting light from the sky azimuth, said retroreflective element on the back of said support cooperating with a forwardly spaced surface of said support to reflect a virtual image of the sun to the eye, and reference means comprising a clear area within said retroreflective element for superimposing said virtual image as seen through said clear area upon said target to aim a reflected light signal from said mirror coating at said target, the said clear window providing direct wide angle vision therethrough of the sky field to facilitate the following of the said target while aligning the said virtual image with said target.

2. A mirror signaling device of the type described in claim 1, in which the reference means includes at least one sighting aperture in said retroreflective element for final aiming of the reflected light signal from said mirror coating upon said target.

3. A mirror signaling device of the type described in claim 1, in which the reference means includes a plurality of closely adjacent sighting apertures in said retroreflective element in substantial alignment with an elongated edge of said retroreflective element, and in which a colored filter covers one of said apertures.

4. A mirror signaling device of the type described in claim 1, in which said retroreflective element, extending the entire width of said open space, defines a second elongated clear window below said retroreflective element through said open space, said elongated clear window below said retroreflective element being elongated in a similar direction to said clear window above said retroreflective element to provide substantially unobstructed vision through said open space.

5. A mirror signaling device of the type described in claim 4, in which the said open space is located adjacent one end of the support and the said elongated clear windows above and below said retroreflective element being symmetrically arranged to thereby provide substantially the same sky view and functioning when the mirror is rotated 180 degrees in the plane of the mirror and alternately used before either the right eye or the left eye of the observer while leaving the other eye unobstructed to view the entire sky field.

References Cited in the file of this patent

UNITED STATES PATENTS

| | | |
|---|---|---|
| 1,278,302 | Campbell | Sept. 10, 1918 |
| 2,412,616 | Hunter | Dec. 17, 1946 |
| 2,557,108 | Hunter | June 19, 1951 |
| 2,589,618 | Learned | Mar. 18, 1952 |